United States Patent
Kumar et al.

[19]

[11] Patent Number: 5,937,429
[45] Date of Patent: Aug. 10, 1999

[54] CACHE MEMORY HAVING A SELECTABLE CACHE-LINE REPLACEMENT SCHEME USING CACHE-LINE REGISTERS IN A RING CONFIGURATION WITH A TOKEN INDICATOR

[75] Inventors: Manoj Kumar; Peichun Peter Liu; Huy Pham; Rajinder Paul Singh, all of Austin, Tex.

[73] Assignee: International Business Machines Corporation, Armonk, N.Y.

[21] Appl. No.: 08/844,550

[22] Filed: Apr. 21, 1997

[51] Int. Cl.[6] ...................................................... G06F 12/12
[52] U.S. Cl. .............................................................. 711/133
[58] Field of Search .................................... 711/133, 134, 711/144, 145, 135, 3

[56] References Cited

U.S. PATENT DOCUMENTS

| | | | |
|---|---|---|---|
| 3,905,141 | 9/1975 | Chichester, Jr. .......................... | 40/125 |
| 4,774,654 | 9/1988 | Pomerene et al. ....................... | 364/200 |
| 4,928,239 | 5/1990 | Baum et al. ............................. | 711/136 |
| 5,155,825 | 10/1992 | Moughanni et al. .................... | 711/207 |
| 5,218,567 | 6/1993 | Suzuki et al. ............................ | 365/177 |
| 5,619,675 | 4/1997 | De Marline et al. .................... | 711/133 |
| 5,737,752 | 4/1998 | Hilditch ................................... | 711/133 |
| 5,754,791 | 5/1998 | Dahlgren et al. .................. | 395/200.72 |
| 5,778,432 | 7/1998 | Rubin et al. ............................. | 711/135 |

*Primary Examiner*—John W. Cabeca
*Assistant Examiner*—Felix B. Lee
*Attorney, Agent, or Firm*—Anthony V.S. England; Antony P. Ng; Andrew J. Dillon

[57] ABSTRACT

A cache memory having a selectable cache-line replacement scheme is described. In accordance with a preferred embodiment of the present invention, the cache memory has a number of cache lines, a number of token registers, a token, and a selection circuit. The token registers are connected to each other in a ring configuration. There is an equal number of token registers and cache lines, and each of the token registers is associated with one of the cache lines. The token is utilized to indicate one of the cache lines as a candidate for replacement by the associated token register in which the token settles. The selection circuit is associated with all of the token registers. This selection circuit provides at least two methods of controlling the movement of the token within the ring of the token registers, to be selectable during runtime. Each method of token movement represents a cache-line replacement scheme.

17 Claims, 4 Drawing Sheets

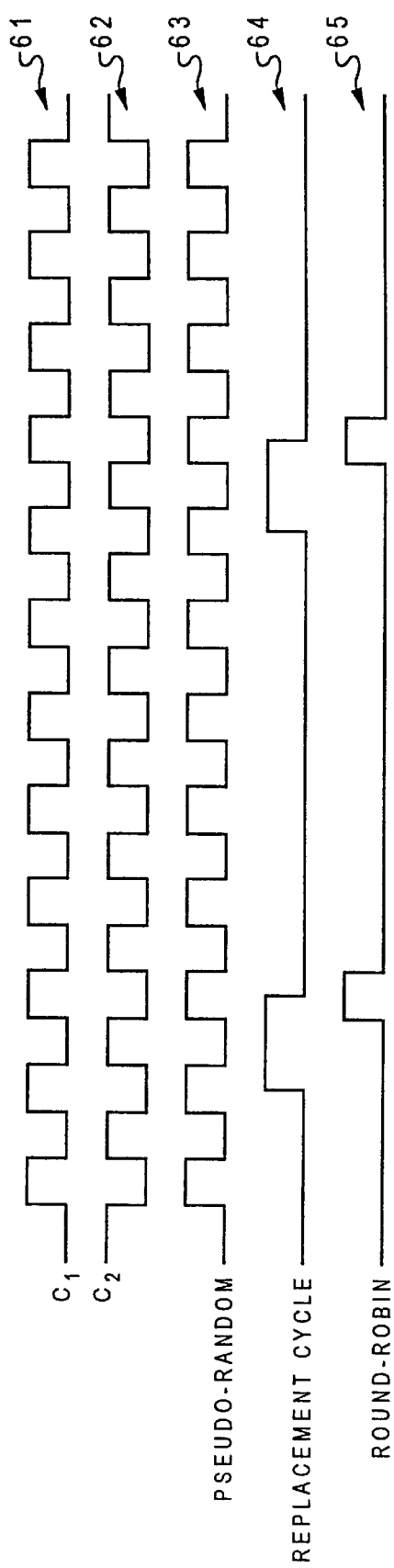

CACHE MEMORY HAVING A SELECTABLE CACHE-LINE REPLACEMENT SCHEME USING CACHE-LINE REGISTERS IN A RING CONFIGURATION WITH A TOKEN INDICATOR

BACKGROUND OF THE INVENTION

1. Technical Field

The present invention relates to a cache memory for data storage in general and, in particular, to a cache memory having multiple cache-line replacement schemes. Still more particularly, the present invention relates to a cache memory having a selectable cache-line replacement scheme.

2. Description of the Prior Art

In conjunction with a system memory, a high-performance data-processing system typically also includes a cache memory. A cache memory is a small, high-speed memory that is interposed between a processor and the system memory of the data-processing system. A portion of the information, such as data or instructions, stored in the system memory may be copied into the cache memory so that this information will be available to the processor in a shorter time than it would be from the system memory.

When the information requested by the processor cannot be found in the cache memory, i.e., a cache miss, the required information must be obtained from the system memory. In addition to the immediate usage by the processor, a copy of such information will also be placed into the cache memory for any future usage by the processor. This process of loading the requested information from the system memory to the cache memory is known as linefill. At this time, if the cache memory has been completely filled, some information already stored in the cache memory will have to be cast-out or invalidated in order to make room for the new information. Accordingly, it is important to have a strategy to decide what information already in the cache memory should be discarded such that the "hit" rate of the cache memory will not be adversely affected.

In terms of cache-line replacement schemes, there are at least two schemes that are commonly employed, namely, *Random and Least Recently Used* (LRU). A random replacement scheme allows information to be allocated uniformly within the cache memory while an LRU replacement scheme reduces the chance of throwing out information that may be needed by the processor again in due course. This makes use of a corollary of temporal locality: If recently used cache lines are likely to be utilized again, then the best candidate for disposal is the least recently used cache line.

The effectiveness of a cache-line replacement scheme typically depends on the type of application software running within the processor. In other words, one cache-line replacement scheme may work extremely well with one certain application software while producing only mediocre results with other application software. Hence, it is difficult for a prior-art cache memory having only one built-in cache-line replacement scheme to produce a consistently high "hit" ratio regardless of the type of application software running within the processor. Consequently, it would be desirable to provide a cache memory having a selectable cache-line replacement scheme such that different cache line replacement schemes can be selected to accommodate various types of application software.

SUMMARY OF THE INVENTION

In view of the foregoing, it is therefore an object of the present invention to provide an improved cache memory for data storage.

It is another object of the present invention to provide an improved cache memory having multiple cache-line replacement schemes.

It is yet another object of the present invention to provide an improved cache memory having a selectable cache-line replacement scheme.

In accordance with a preferred embodiment of the present invention, a cache memory has a number of cache lines, a number of token registers, a token, and a selection circuit. The token registers are connected to each other in a ring configuration. There is an equal number of token registers and cache lines, and each of the token registers is associated with one of the cache lines. The token is utilized to indicate one of the cache lines as a candidate for replacement by the associated token register in which the token settles. The selection circuit is associated with each of the token registers. This selection circuit provides at least two methods of controlling the movement of the token within the ring of token registers, to be selectable during runtime. Each method of token movement represents a cache-line replacement scheme.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a timing diagram of the circuit for providing a selectable cache-line replacement scheme of FIG. 3.

DETAILED DESCRIPTION OF A PREFERRED EMBODIMENT

The present invention may be implemented in any data-processing system having a cache memory. Also, it is understood that the features of the present invention may be applicable in various data-processing systems having a primary cache and a secondary cache.

Figure 1:
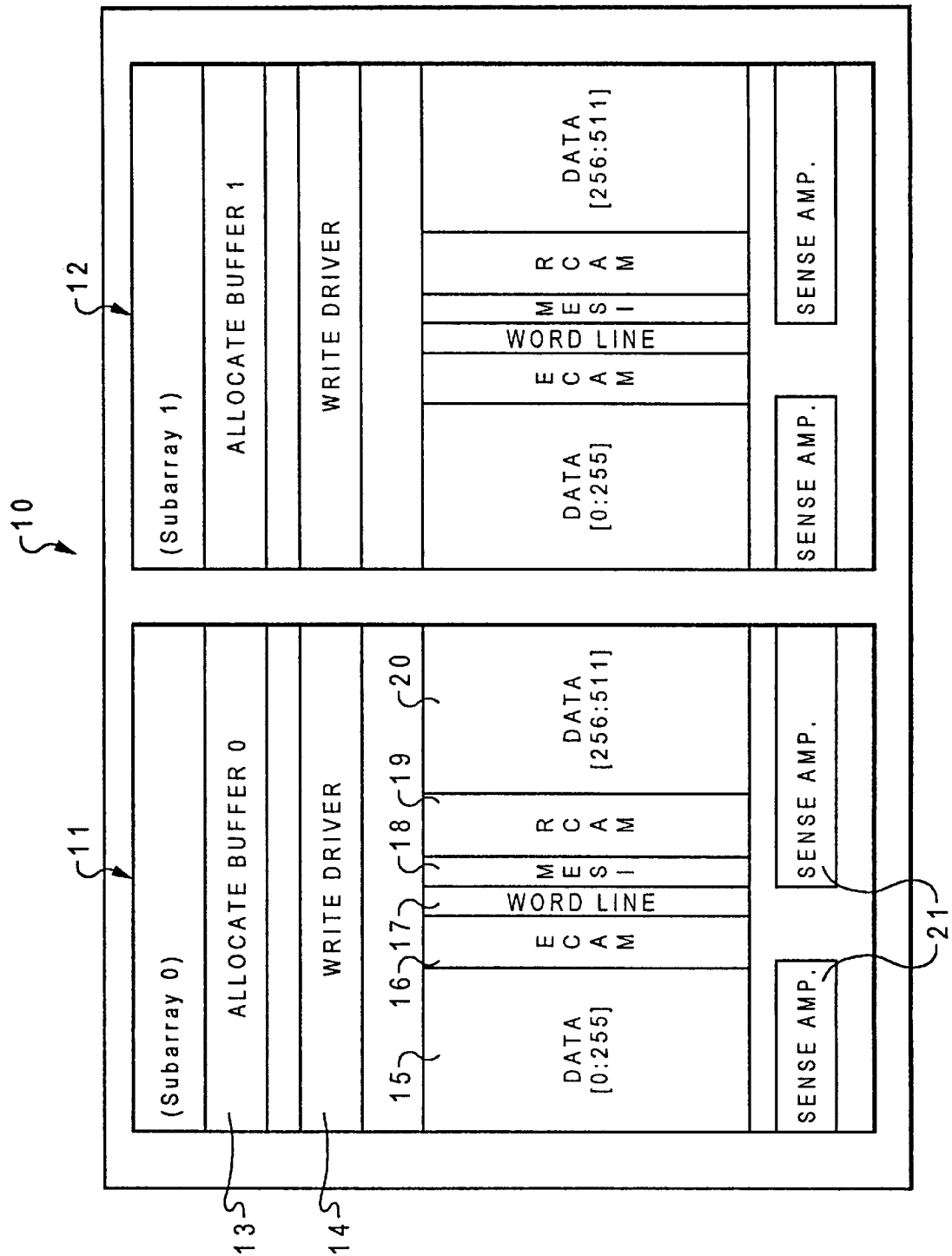
FIG. 1 is a block diagram of a cache memory in which a preferred embodiment of the present invention may be incorporated.

Referring now to the drawings and in particular to FIG. 1, there is illustrated a block diagram of a cache memory in which a preferred embodiment of the present invention can be incorporated. Cache memory 10 preferably includes two subarrays 11 and 12; however, as those skilled in the art will appreciate upon reference to the present specification, a larger number of subarrays may be provided. Because subarrays 11 and 12 are essentially identical, only subarray 11 will be described in further detail.

Subarray 11 preferably includes 128 cache lines. Each cache line includes a 512-bit data field, which is broken into two segments, as depicted at 15 and 20 within subarray 11. Each cache line also preferably includes a 64-bit parity field (not shown), a 9-bit ECAM field 16, a 28-bit RCAM field 19, a word line field 17, and a 3-bit MESI field 18. As those skilled in the art will appreciate, the so-called "MESI" is an acronym which stands for "Modified," "Exclusive," "Shared," and "Invalid." The status of any cache line may be efficiently determined by interrogating the status of the bits within MESI field 18. Also, the status of any cache line may be altered by writing different bits into MESI field 18.

Additionally, subarray 11 includes an associated allocate buffer 13 and an associated write driver 14 that are utilized to drive data into a particular cache line. Similarly, sense amplifier 21 is provided for amplifying an output signal from a particular cache line.

Figure 2:
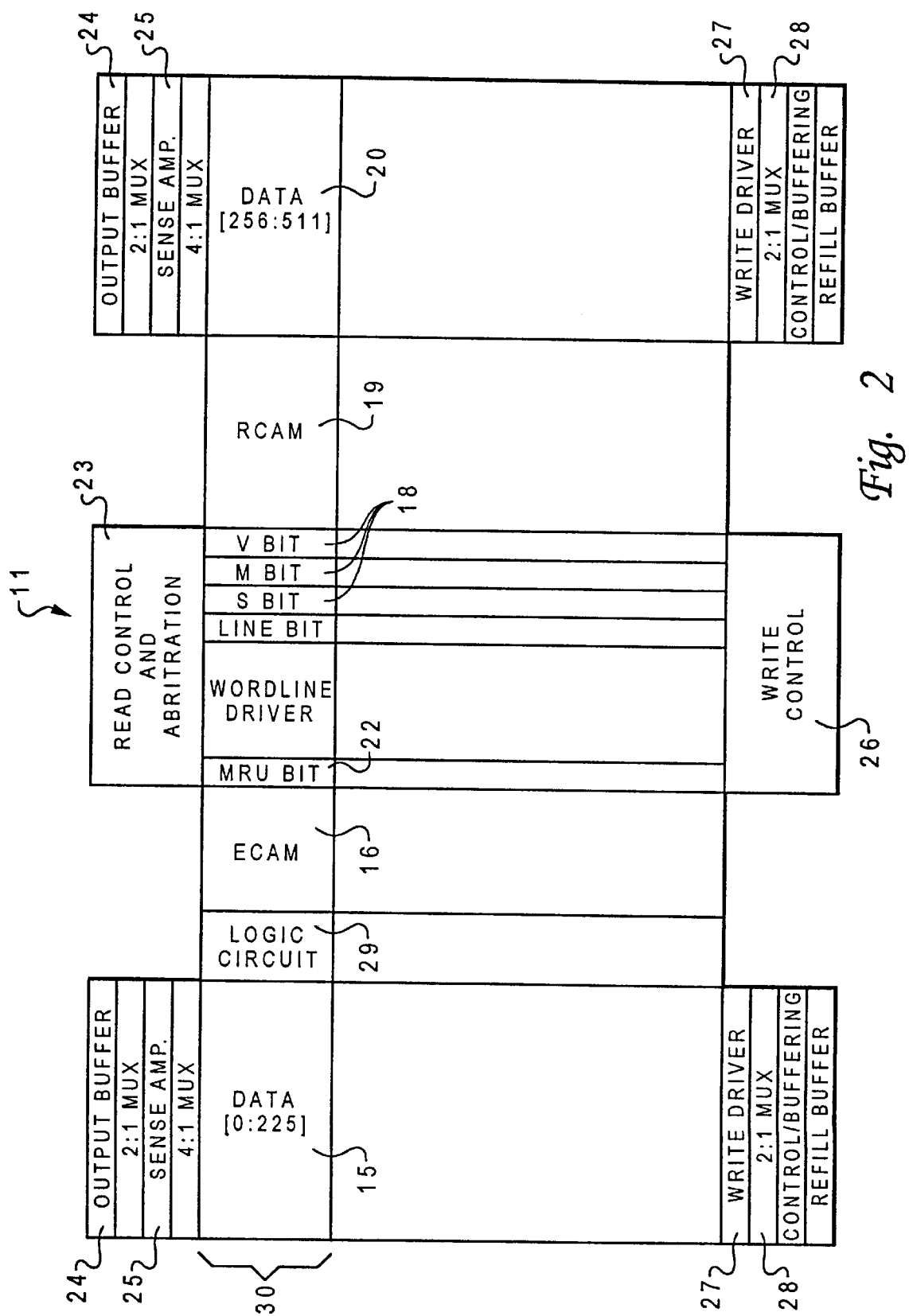
FIG. 2 is a detailed illustration of a subarray within the cache memory of FIG. 1.

With reference now to FIG. 2, there is depicted a detailed illustration of subarray 11 within the cache memory of FIG. 1. As shown, each cache line 30 within subarray 11 includes 512 bits of data which are divided into data fields 15 and 20. ECAM field 16 is preferably a 9-bit effective-address content-addressable field, and RCAM field 19 is preferably a 28-bit real-address content-addressable field. By providing two separate and distinct content-addressable fields-ECAM field 16 and RCAM field 19—within each cache line, data within that cache line may be accessed in a number of efficient sequences. In addition, a most recently utilized (MRU) bit field 22 is utilized in conjunction with ECAM field 16 to resolve offset and aliasing situations. Also, the bits within MESI field 18 are illustrated in greater details.

Read control and arbitration circuit 23, output buffers 24, and sense amplifiers 25 are utilized in a conventional manner to read data from a cache line. Finally, write control circuit 26 is utilized in conjunction with write drivers and the associated multiplexers, as indicated at 27 and 28, to permit data within subarray 11 to be written.

As a preferred embodiment of the present invention, there are two cache-line replacement logic schemes present within logic circuit 29 of subarray 11. Each cache-line replacement logic scheme may be utilized for allocating one of the 128 cache lines within subarray 11 for removal or cast-out and subsequent replacement, in the event of a "cache miss." Each of the two cache-line replacement schemes is selectable by a processor associated with the cache memory of FIG. 1.

Figure 3:
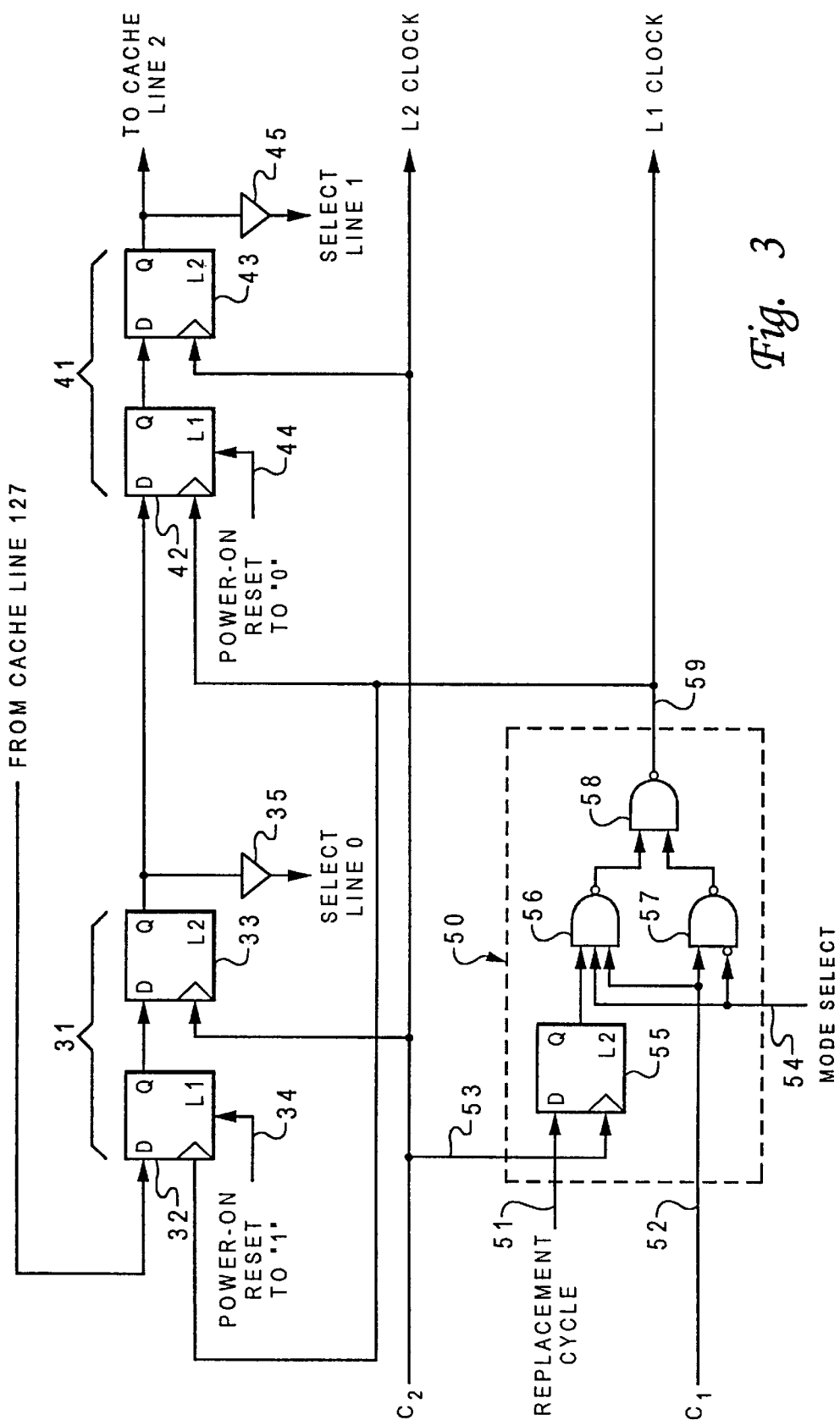
FIG. 3 is a detailed illustration of a circuit for providing a selectable cache-line replacement scheme in accordance with a preferred embodiment of the present invention.

Referring now to FIG. 3, there is depicted a detailed illustration of a circuit for providing a selectable cache-line replacement scheme in accordance with a preferred embodiment of the present invention. As mentioned previously, there is a total of 128 cache lines (cache line 0 through cache line 127) in the subarray of FIG. 2. Associated with each of the 128 cache lines, there is a token register. All 128 token registers are connected with each other in a token-ring fashion, so that the token may be passed from one register to the next register in the ring. Although only token register 31 for cache line 0 and token register 41 for cache line 1 are shown in FIG. 3, those skilled in the art will appreciate that all token registers for each subsequent cache line within the token ring are identical to token register 41 for cache line 1.

Token register 31 for cache line 0 is implemented by flip-flop 32 as the master and flip-flop 33 as the slave. Flip-flop 32 is preferably clocked by an L1 clock while flip-flop 33 is preferably clocked by an L2 clock. The L1 clock is generated by a cache-line replacement scheme circuit 50. The L2 clock is the same as a second clock, $C_2$, of the processor. Similar to token register 31, token register 41 for cache line 1 is implemented by flip-flop 42 as the master and flip-flop 43 as the slave. Flip-flop 42 is also preferably clocked by the L1 clock while flip-flop 43 is preferably clocked by the L2 clock. The only difference between token register 31 and token register 41 is at the power-on resets 33 and 44. As a preferred embodiment of the present invention, token register 31 supports power-on reset to a logical "1," while token register 41 (and each token register for the subsequent cache lines) supports power-on reset to a logical "0." The logical "1" within a token register signifies the token is settling within that token register such that the associated cache line is a candidate for replacement.

When a cache line is replaced, the cache line selected for replacement is the cache line associated with the token register in which the token is stored. In addition, token register 31 has a select line 35 and token register 41 has a select line 45. A cache line of an associated token register, in which the token settles, will be selected for line replacement via the corresponding select line. For example, if the token is residing within token register 41 of cache line 1, then select line 45 will become active for selecting cache line 1 as a replacement candidate.

The occasion for the token to move from one token register to the next token register is dictated by replacement scheme selection circuit 50. There are preferably four inputs 51, 52, 53, 54 and one output 59 in selection circuit 50. Input 51 is for a cache-line replacement cycle signal. For an instruction cache memory, the cache-line replacement cycle signal is represented by a signal commonly known as "refill." For a data cache memory, the cache-line replacement cycle signal is represented by a signal commonly known as "allocation." Both of these signals signifies that a cache-line replacement will occur in a next processor cycle.

Input 52 is for a first processor clock, $C_1$, and input 53 is for a second processor clock, $C_2$. Input 54 is for a mode select signal that preferably comes from a processor associated with the cache memory. As a preferred embodiment of the present invention, there are two modes provided within the cache memory. Each mode allows the tokens to be moved a certain way within the ring of token registers. One of the two modes which may be selected via input 54 is by a mode select signal. As a preferred embodiment of the present invention, if the mode select signal to input 54 is a logical "0," the token will move from one token register to another token register with each cycle of first processor clock, C1. That is, in response to first processor clock, C1, the token will move from token register 0, to token register 1, to token register 2, and so on. Otherwise, if the mode select signal to input 54 is a logical "1," the token will only move from a first token register to another token register in response to a cache-line replacement at the cache line associated with the first token register. That is, in response to replacement of cache line 0 when the token is in token register 0, the token will move to token register 1. In response to replacement of cache line 1, the token will move to token register 2, and so on. The former mode of token movement can be called a pseudo-random cache-line replacement scheme because the token could be settling in any one of the 128 cache lines when a cache line replacement is needed. On the other hand, the latter mode of token movement can be called a first-in-first-out or round-robin cache-line replacement scheme because the first replaced cache line will only be replaced again after all other 127 cache lines have already been replaced. As mentioned previously, each of these two cache-line replacement schemes has its own merits depending on the application software running within the processor.

Within selection circuit 50, there are flip-flop 55, three-input NAND gate 56, two-input NAND gate 57, and two-input NAND gate 58. Input 51 is connected to the data input of flip-flop 55. Input 53 is connected to the clock input of flip-flop 55. Along with input 52, input 54 is also connected to the input of NAND gate 56 and NAND gate 57. Each output from NAND gate 56 and NAND gate 57 is connected to the inputs of NAND gate 58. Output 59 from NAND gate 58 is utilized to feed the clock input of the first flip-flop of each token register within the token register ring. As shown in FIG. 3, output 59 is fed to the clock input of flip-flop 32 of token register 31 and the clock input of flip-flop 42 of token register 41.

With reference now to FIG. 4, there is illustrated a timing diagram of the circuit for providing a selectable cache-line replacement scheme of FIG. 3. Waveform 61 and waveform 62 are the regular clock cycles from processor clock $C_1$ and processor clock $C_2$, respectively. Selection circuit 50 outputs waveform 63 from output 59 when a pseudo-random mode is selected via mode select input 54. On the other hand, if a round-robin mode is selected, output 59 is asserted only if input 51 is asserted. This is illustrated by waveform 64 and waveform 65. There are only two instances that waveform 65 goes to a logical "1," and both instances are subsequent to an occurrence of a logical "1" within waveform 64. As mentioned previously, replacement cycle waveform 64 can represent either a refill or allocation, depending the type of cache it represents.

As has been described, the present invention provides an improved cache memory having a selectable cache-line replacement scheme. The selection can be made by a processor that is associated with the cache memory or any other device that may seem appropriate. Although only two cache-line replacement schemes are described in the present description, a higher number of cache-line replacement schemes may be added to the cache memory as may be deemed necessary according to the application.

While the invention has been particularly shown and described with reference to a preferred embodiment, it will be understood by those skilled in the art that various changes in form and detail may be made therein without departing from the spirit and scope of the invention.

What is claimed is:

1. A cache memory having a selectable cache-line replacement scheme, said cache memory comprising:
   a plurality of cache lines;
   a plurality of token registers, wherein each of said plurality of token registers is associated with one of said plurality of cache lines;
   a token for indicating one of said plurality of cache lines for replacement; and
   a selection circuit associated with said plurality of token registers for selecting one of at least two cache replacement schemes in response to a replacement scheme selection signal, wherein said selected cache replacement scheme dictates a pattern of movement of said token among said plurality of token registers.

2. The cache memory according to claim 1, wherein said token register includes two flip-flops.

3. The cache memory according to claim 1, wherein said token is represented by a logical "1" within one of said token registers.

4. The cache memory according to claim 1, wherein said selection circuit includes a flip-flop and three NAND gates.

5. The cache memory according to claim 1, wherein said token register is associated with one of said cache lines via a select line.

6. The cache memory according to claim 1, wherein said at least two cache replacement schemes include a pseudo-random method and a round-robin method.

7. The cache memory according to claim 1, wherein said plurality of token registers are connected to each other in a ring configuration.

8. The cache memory according to claim 1, wherein said replacement cache line is indicated by the associated token register in which said token settles.

9. The cache memory according to claim 1, wherein said plurality of token registers has a first clock signal as an input and said selection circuit has said first clock signal and a second clock signal as inputs.

10. A method for providing a cache memory with a selectable cache-line replacement scheme, wherein said cache memory includes a plurality of cache lines, said method comprising the steps of:
    associating a token register with each one of said cache lines;
    initiating a token within one of said token registers, wherein said token is utilized to indicate one of said plurality of cache lines for replacement; and
    associating a selection circuit with said token registers, wherein said selection circuit selects one of at least two cache replacement schemes in response to a replacement scheme selection signal, wherein said selected cache replacement scheme dictates a pattern of movement of said token among said plurality of token registers.

11. The method according to claim 10, wherein said token register further includes two flip-flops.

12. The method according to claim 10, wherein said step of initiating a token within one of said token registers further includes a step of initiating a logical "1" within one of said token registers.

13. The method according to claim 10, wherein said selection circuit further includes a flip-flop and three NAND gates.

14. The method according to claim 10, wherein said at least two cache replacement schemes includes a pseudo-random method and a round-robin method.

15. The method according to claim 10, wherein said method further includes a step of connecting all of said token registers to each other in a ring configuration.

16. The method according to claim 10, wherein said step of by the associated token register in which said token settles.

17. The method according to claim 10, wherein said method further includes a step of associating said plurality of token registers with a first clock signal as an input and a step of associating said selection circuit with said first clock signal and a second clock signal as inputs.

* * * * *